US011201824B2

(12) United States Patent
Ma et al.

(10) Patent No.: US 11,201,824 B2
(45) Date of Patent: Dec. 14, 2021

(54) METHOD, ELECTRONIC DEVICE AND COMPUTER PROGRAM PRODUCT OF LOAD BALANCING FOR RESOURCE USAGE MANAGEMENT

(71) Applicant: EMC IP Holding Company LLC, Hopkinton, MA (US)

(72) Inventors: Tianyu Ma, Shanghai (CN); Lu Tian, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/833,391

(22) Filed: Mar. 27, 2020

(65) Prior Publication Data

US 2021/0168078 A1 Jun. 3, 2021

(30) Foreign Application Priority Data

Nov. 29, 2019 (CN) ........................ 201911211629.X

(51) Int. Cl.

| | |
|---|---|
| ***H04L 12/803*** | (2013.01) |
| ***H04L 12/911*** | (2013.01) |
| ***G06F 9/48*** | (2006.01) |
| ***G06F 9/50*** | (2006.01) |
| *H04L 29/08* | (2006.01) |

(52) U.S. Cl.

CPC ............ *H04L 47/125* (2013.01); *G06F 9/485* (2013.01); *G06F 9/4856* (2013.01); *G06F 9/505* (2013.01); *G06F 9/5022* (2013.01); *G06F 9/5055* (2013.01); *G06F 9/5072* (2013.01); *G06F 9/5083* (2013.01); *H04L 47/82* (2013.01); *G06F 9/5088* (2013.01); *H04L 29/08135* (2013.01)

(58) Field of Classification Search

CPC .... G06F 9/5072; G06F 9/5083; G06F 9/5088; G06F 9/485; G06F 9/4856; G06F 9/5022; G06F 9/505; G06F 9/5055; H04L 29/08135; H04L 47/125; H04L 47/82

See application file for complete search history.

(56) References Cited

U.S. PATENT DOCUMENTS

| | | | | |
|---|---|---|---|---|
| 9,256,467 | B1 * | 2/2016 | Singh | G06F 9/5005 |
| 9,665,407 | B2 * | 5/2017 | Lakshmanan | G06F 9/505 |
| 10,162,678 | B1 * | 12/2018 | Stafford | G06F 9/5077 |
| 10,445,134 | B2 * | 10/2019 | Borthakur | G06F 9/4856 |
| 2009/0019449 | A1 * | 1/2009 | Choi | G06F 9/5088 718/105 |

(Continued)

*Primary Examiner* — George C Neurauter, Jr.
(74) *Attorney, Agent, or Firm* — Amin, Turocy & Watson, LLP

(57) ABSTRACT

Embodiments of the present disclosure provide a method, an electronic device and a computer program product of load balancing. The method comprises collecting, at a target device in a distributed system, resource usage information of a plurality of devices in the distributed system. The method further comprises determining a first work task for the target device to be stopped based on the resource usage information, the target device having a first authority to execute the first work task. The method further comprises causing the first authority to be released. With the embodiments of the present disclosure, each node in the distributed system can individually balance different task loads and the use of resources by different operations of the task, thereby improving the performance of the distributed system.

20 Claims, 7 Drawing Sheets

(56) References Cited

U.S. PATENT DOCUMENTS

| | | | | |
|---|---|---|---|---|
| 2009/0276771 | A1* | 11/2009 | Nickolov | H04L 67/1014 717/177 |
| 2011/0047554 | A1* | 2/2011 | Lakshmanan | G06F 9/505 718/105 |
| 2011/0276542 | A1* | 11/2011 | Whitehouse | G06F 16/1774 707/688 |
| 2013/0179881 | A1* | 7/2013 | Calder | G06F 9/5088 718/1 |
| 2014/0040343 | A1* | 2/2014 | Nickolov | H04L 67/1029 709/201 |
| 2014/0215486 | A1* | 7/2014 | DeRosa | G06F 9/5088 718/105 |
| 2015/0052531 | A1* | 2/2015 | Helak | G06F 9/4856 718/102 |
| 2015/0154047 | A1* | 6/2015 | Chen | G06F 9/5083 718/103 |
| 2015/0154056 | A1* | 6/2015 | Chen | G06F 9/5083 718/103 |
| 2015/0188989 | A1* | 7/2015 | Chaliparambil | H04L 67/10 709/204 |
| 2017/0134526 | A1* | 5/2017 | Chaliparambil | H04L 67/34 |
| 2017/0223115 | A1* | 8/2017 | Childs | H04L 67/10 |
| 2017/0329651 | A1* | 11/2017 | Ragupathi | G06F 9/4806 |
| 2018/0011744 | A1* | 1/2018 | Liguori | G06F 9/526 |
| 2018/0373750 | A1* | 12/2018 | Zhu | H04L 67/1076 |
| 2019/0108064 | A1* | 4/2019 | Stafford | G06F 9/5083 |
| 2019/0114203 | A1* | 4/2019 | James | H04L 41/046 |
| 2019/0179666 | A1* | 6/2019 | Helak | G06F 9/4856 |
| 2019/0310881 | A1* | 10/2019 | Gupta | G06F 9/45558 |
| 2020/0026561 | A1* | 1/2020 | Slinger | G06F 9/4881 |
| 2020/0159588 | A1* | 5/2020 | Stafford | G06F 9/5083 |
| 2021/0103482 | A1* | 4/2021 | Feldman | G06F 9/5027 |

* cited by examiner

```
200
 ↓

┌─ 210
COLLECT, AT A TARGET DEVICE IN A DISTRIBUTED SYSTEM, RESOURCE
USAGE INFORMATION OF A PLURALITY OF DEVICES IN THE DISTRIBUTED
SYSTEM

┌─ 220
DETERMINE A FIRST WORK TASK FOR THE TARGET DEVICE TO BE
STOPPED BASED ON THE RESOURCE USAGE INFORMATION, THE TARGET
DEVICE HAVING A FIRST AUTHORITY TO EXECUTE THE FIRST WORK TASK

┌─ 230
CAUSE THE FIRST AUTHORITY TO BE RELEASED
```

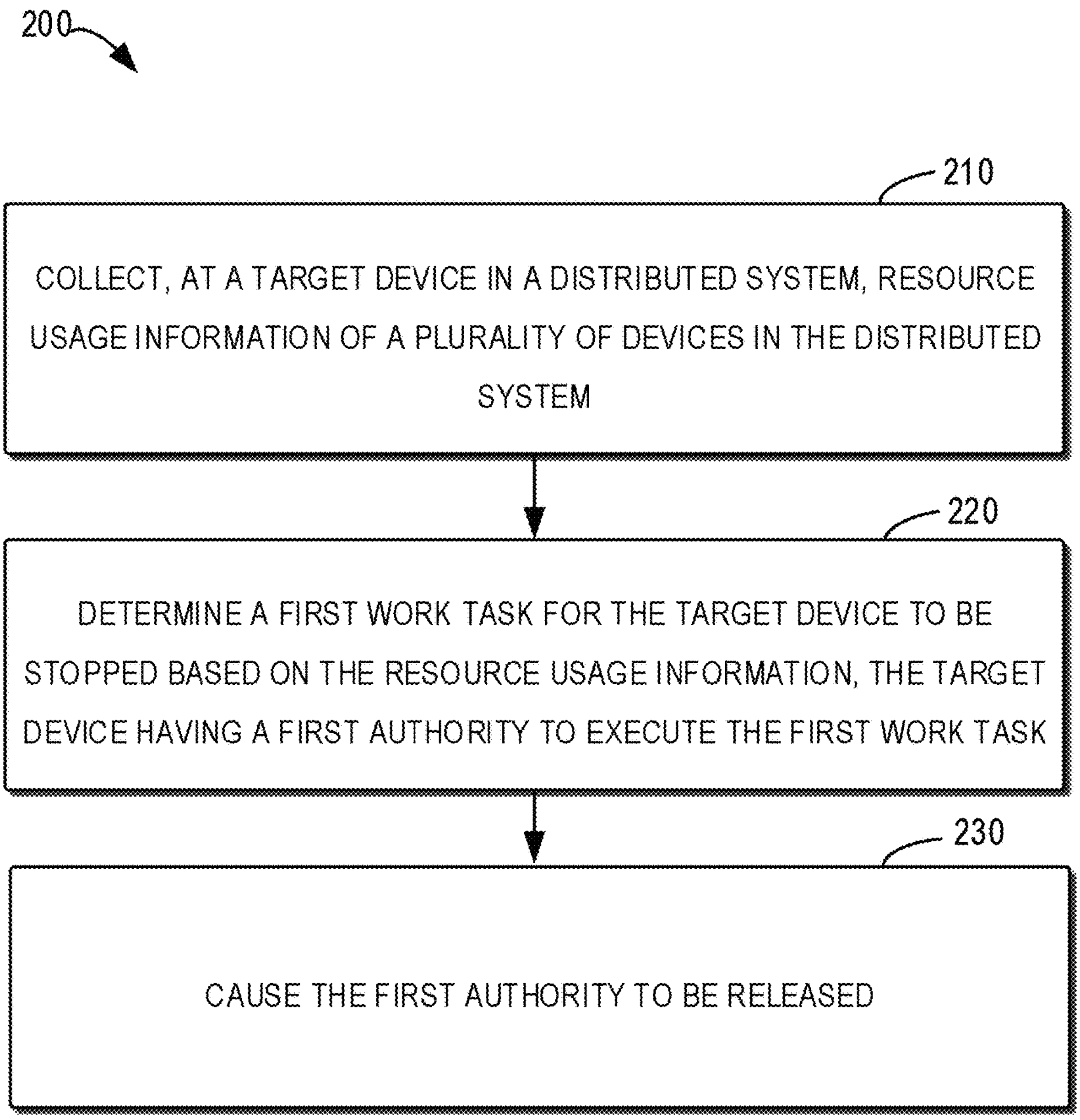

Fig. 2

METHOD, ELECTRONIC DEVICE AND COMPUTER PROGRAM PRODUCT OF LOAD BALANCING FOR RESOURCE USAGE MANAGEMENT

RELATED APPLICATION

The present application claims the benefit of priority to Chinese Patent Application No. 201911211629.X, filed on Nov. 29, 2019, which application is hereby incorporated into the present application by reference herein in its entirety.

FIELD

Embodiments of the present disclosure relate to the field of distributed computing, and more particularly, to a method, an electronic device, and a computer program product of load balancing.

BACKGROUND

Distributed systems and distributed applications are increasingly used. In a distributed system, there are a plurality of nodes, each node has a processor or at least processor resources, and typically has a separate operating system. The plurality of nodes can collaboratively process multiple tasks in parallel, thereby improving the efficiency of processing tasks. However, a large number of concurrent tasks in a distributed system may affect each other due to contention for limited shared distributed system resources, such as network bandwidth, CPU, memory, and disk bandwidth.

In such a distributed system, in the absence of a load balancing policy, when the resources on a node are insufficient, tasks are still allocated continuously to the node, thereby causing the tasks to fail. In addition, if there is no good load balancing policy and no suitable execution resources can be found, the task is always in a waiting state, which reduces the execution efficiency of the task.

SUMMARY

Embodiments of the present disclosure provide a solution for load balancing.

In a first aspect of the present disclosure, a method of load balancing is provided. The method comprises collecting, at a target device in a distributed system, resource usage information of a plurality of devices in the distributed system. The method further comprises determining a first work task for the target device to be stopped based on the resource usage information, the target device having a first authority to execute the first work task. The method further comprises causing the first authority to be released.

In a second aspect of the present disclosure, an electronic device is provided. The device comprises a processor, and a memory coupled to the processor and having instructions stored thereon, the instructions, when executed by the processor, causing the device to perform acts. The acts comprise collecting, at a target device in a distributed system, resource usage information of a plurality of devices in the distributed system. The acts further comprise: determining a first work task for the target device to be stopped based on the resource usage information, the target device having a first authority to execute the first work task. The acts further comprise causing the first authority to be released.

In a third aspect of the present disclosure, a computer program product is provided. The computer program product is tangibly stored on a computer-readable medium and comprises machine-executable instructions that, when executed, cause a machine to perform the method according to the first aspect.

The Summary is provided to introduce a selection of concepts in a simplified form, which will be further described in the following Detailed Description. This Summary is not intended to identify key features or main features of the present disclosure, nor is it intended limit the scope of the present disclosure.

BRIEF DESCRIPTION OF THE DRAWINGS

The above and other objectives, features, and advantages of the present disclosure will become more apparent by describing the exemplary embodiments of the present disclosure in more detail with reference to the accompanying drawings. In the exemplary embodiments of the present disclosure, the same reference numerals generally represent the same components. In the figures:

FIG. 2 shows a flowchart of a process for load balancing according to an embodiment of the present disclosure;

DETAILED DESCRIPTION OF EMBODIMENTS

Figure 1:
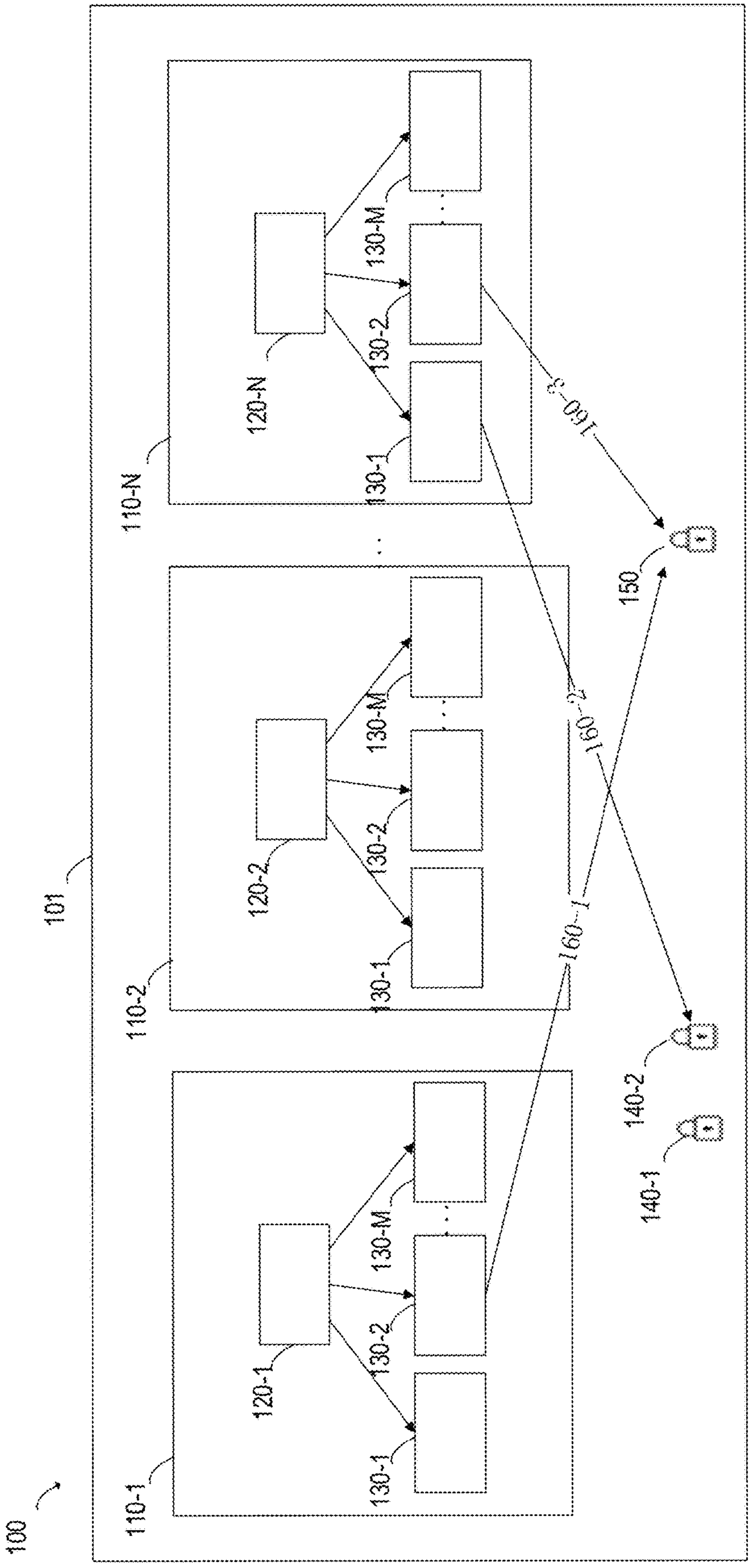
FIG. 1 shows a schematic diagram of an example environment in which embodiments of the present disclosure can be implemented.

Principles of the present disclosure will be described below with reference to several example embodiments illustrated in the accompanying drawings. Although some embodiments of the present disclosure are shown in the accompanying drawings, it should be understood that these embodiments are only described to enable those skilled in the art to better understand and thereby implement the present disclosure, and not to limit a scope of the present disclosure in any way.

As used herein, the term "comprising" and its variants mean open-ended inclusion, that is, "comprising but not limited to." Unless specifically stated otherwise, the term "or" means "and/or". The term "based on" means "based at least in part on." The terms "one example embodiment" and "one embodiment" mean "at least one example embodiment." The term "another embodiment" means "at least one further embodiment." The terms "first", "second", etc. may refer to different or the same objects. Other explicit and implicit definitions may be included below.

As mentioned above, in a distributed system, a plurality of nodes can collaboratively process multiple tasks in parallel, and such in-parallel processing of multiple tasks may affect each other due to contention for limited shared resources. However, the traditional distributed system does not have a load balancing policy for task allocation. Instead, when tasks are allocated, consumption of resources on the node that processes the task is not taken into account, and tasks will continue to be randomly allocated to the node even if the resources on that node have been exhausted. When a certain server in a node runs too many tasks, causing the server in the node to consume too many resources and affecting its processing performance, task execution will fail. Especially when the system is overloaded, i.e., the task demand exceeds the service capability of the distributed system, not only I/O congestion may occur, but the service quality (such as throughput, delay, packet loss rate, etc.) is not guaranteed.

In addition, in traditional solutions, a master node or coordinator is usually used to perform load balancing. The master node or coordinator can collect resource usage information of other nodes in a distributed system, and determine which node to allocate tasks to, and decide to migrate certain tasks from one node to other nodes based on the resource usage information. However, this method makes the load balancing work quality of the entire distributed system completely depend on the performance of the master node or coordinator. If the master node or coordinator fails, or when the hardware configuration capacity of the master node or coordinator is low, effective load balancing cannot be performed, which will affect the execution of tasks in the system.

In view of the above problems and potentially other problems, the present disclosure provides a load balancing solution. In this solution, resource usage information of a plurality of devices in a distributed system is collected at a target device in the distributed system. The target node determines a first work task for the target device to be stopped based on the resource usage information, and the target device has a first authority to execute the first work task. Then, the first authority is caused to be released. By collecting the resource usage information at each node in the distributed system, each node in the distributed system can dynamically migrate the load according to the resource usage status, so that the task load is evenly distributed on the nodes as much as possible. In addition, since all nodes in the distributed system can assume the load balancing task, once an individual node fails or the workload is too heavy, other nodes can also perform effective load balancing according to the resource usage status.

In the text herein, the term "a device in a distributed system" refers to a node in a distributed system. The device may be a physically independent electronic device that has a processor or at least processor resources, and may have a separate operating system. It should be understood that the device may also be a logically independent electronic device. A plurality of devices in the distributed system can execute a task in cooperation with each other.

In the text herein, the term "work task" is the work to be executed on the nodes in the distributed system, which has certain work content. The work task is, for example, communicating with a device outside the distributed system, such as a Ranger server and an Ambari server (the Ranger server and the Ambari server are both WEB-based open source software). For a Ranger task in a distributed file system, the work content of this work task is to download a policy from a Ranger server. In each work task there are some "jobs" to be executed. For a work task, it may be implemented as different instances on different nodes, such as entities that run on the nodes and actually execute the work. In some embodiments, if there is a Ranger agent on each node to execute Ranger tasks, each Ranger agent here can be considered as an instance of a work task. In the following embodiments, the related processing or execution of a work task is sometimes described by an instance of the work task.

In the text herein, the term "authority" refers to the permission required by nodes in a distributed system to execute work tasks. In the embodiments of the present disclosure, "authority" is sometimes also implemented by a "lock". For example, locks can be used in the distributed system to give nodes authority to execute work tasks. The node needs to acquire the lock corresponding to the work task in order to execute the work task. It can be understood that locks can be implemented in multiple ways, for example, this can be implemented in a file storage system by having a work task lock a file.

Hereinafter, embodiments of the present disclosure will be described in detail with reference to the drawings. FIG. 1 illustrates a schematic diagram of an example environment 100 in which embodiments of the present disclosure may be implemented. The distributed system 101 shown in FIG. 1 may be composed of a plurality of devices or nodes 110-1, 110-2, . . . , 110-N interconnected through a network. The distributed system 101 may be a distributed file storage system. For ease of description, these devices or nodes in the distributed system 101 are also collectively referred to as devices or nodes 110. A plurality of work tasks 130-1, 130-2, . . . , 130-M (collectively referred to as work tasks 130 in the following), and a control task are run on each node 110. As shown in FIG. 1, there is a control task 120-1 on the node 110-1, a control task 120-2 on the node 110-2, . . . a control task 120-N on the node 110-N. In the following embodiments, for ease of description, the control tasks 120-1, 120-2, . . . , 120-N are sometimes collectively referred to as the control task 120.

In the distributed system 101, there are many work tasks to be executed. In order to make full use of the resources in the distributed system, each work task has a different number of instances to implement on different nodes according to the content of the work to be executed. Thus, a work task may be executed on one or more nodes. For example, the work task 130-1 needs to be executed on two nodes at the same time. At this time, the two nodes 110-1 and 110-2 respectively have an authority to execute the work task 130-1. As another example, the work task 130-2 may be executed on only one node. At this time, only the node 110-2 has an authority to execute the work task 130-2. Taking the distributed file system as an example, a work task will download data from an external server every 30 seconds, and the work task may be executed on only one node.

In order to limit the number of nodes executing work tasks, a lock is used in a distributed system to request a plurality of nodes 110 to execute the same work task 130 in parallel. When the node 110 needs to execute a work task 130, it needs to apply for authorities from the distributed system. Only when the node 110 acquires the lock corresponding to the work task can the resources required to execute the work task be obtained, thereby executing the work task 130. For example, the work task 130-1 requires two nodes to execute, and therefore the work task 130-1 corresponds to two locks A 140-1 and 140-2. The work task 130-2 requires a node to execute, and therefore it corresponds to a lock B 150. If a node has acquired a lock corresponding to a work task, it may execute the work task. If a node does not acquire a lock corresponding to a work task, the node needs to periodically request a lock corresponding to the work task at a certain frequency. This frequency may be different for different work tasks, resulting in different possibilities of acquiring locks.

In some embodiments, the node 110-1 may collect resource usage information of other nodes 110-2 . . . 110-N in the distributed system 101, and send the collected resource usage information to the respective work task 130 on the node 110-1. The node 110-1 may perform the above-mentioned collection process by the control task 120-1. The control task 120-1 may determine whether to stop one or more work tasks on the node 110-1 based on the resource usage information. In an alternative embodiment, the work task 130 on the node 110-1 may also decide whether to continue the execution according to the resource usage information.

The number of nodes and the number of work tasks shown in FIG. 1 are only exemplary and are not intended to be limiting. It should be understood that any suitable number of nodes and number of work tasks may be used. In addition, the example environment 100 is described with respect to the first node 110-1 for illustrative purposes only, and it may be understood that the description of the first node 110-1 can be applied to any node in the distributed system.

Hereinafter, embodiments of the present disclosure will be described in detail with reference to FIG. 2 to FIG. 7. FIG. 2 illustrates a flowchart of a process 200 for load balancing according to an embodiment of the present disclosure. For ease of discussion, the process 200 is described in conjunction with FIG. 1. For example, the process 200 may be implemented at any node of the distributed system 101, such as the node 110-1 of FIG. 1.

At block 210, resource usage information of a plurality of nodes 110 in the distributed system 101 is collected at the node 110-1, including resource usage information on the node 110-1 and resource usage information on other nodes 110-2 to 110-N. For example, the node 110-1 may collect resource usage information of the node 110-1 and other nodes 110-2 to 110-N. In some embodiments, the control task 120-1 running on the node 110-1 may periodically collect the resource usage information of each node 110. In some embodiments, the resource usage information may include at least one of the following: available amount and/or usage amount of storage resources, available amount and/or usage amount of dedicated processing resources (GPU), available amount and/or usage amount of processing unit resources (CPU). For example, the control task 120-1 on the node 110-1 collects resource usage information every 15 minutes, such as the available amount of memory, the available amount of CPU, and the available amount of disks, etc. of this node 110-1 and other nodes 110-2 to 110-N. It can be understood that the resource usage information may include different status information of various resources required by the node 110 in the distributed system to execute tasks.

In some embodiments, the control task 120-1 may send resource usage information to each work task 130 on the node 110-1. For example, the control task 120-1 on the node 110-1 sends the collected resource usage information, such as the available amount of memory, the available amount of CPU, and available amount of disks, etc. of each node 110, to each work task 130 on the node 110-1.

At block 220, the node 110-1 may determine the work task for the node 110-1 to be stopped (hereinafter referred to as the first work task for convenience of description) based on the resource usage information, and the node 110-1 has an authority (hereinafter referred to as a first authority for convenience of description) to execute the first work task. As can be seen from the description of FIG. 1 above, a plurality of work tasks 130 on the node 110-1 can be in two states: a task execution state that has acquired a lock (authority) and a lock-contending state that has not acquired a lock. For example, the work task 130-1 on the node 110-1 already has the lock 140-1, so the work task 130-1 is in the task execution state, and the work task 130-2 does not have the lock 150, so the work task 130-2 is in the lock-contending state and is contending for the lock 150 at a frequency B1 160-1. By contending for locks, when some nodes fail and release their locks, other nodes can acquire the locks in time so that they may continue to execute the work tasks on the failed nodes without interruption. Only the work task 130 that has obtained the lock (for example, the work task 130-1 on the node 110-1) occupies the resources of the distributed system, and the resource consumption in the lock-contending state can be ignored compared to the work task. The node 110-1 can select the work task 130-1 in the task execution state as an object to be stopped, based on the resource usage information, because stopping the work task 130-1 in the task execution state can release more resources. In some embodiments, the control task 120-1 on the node 110-1 may determine the first work task for the node 110-1 based on the resource usage information. In some embodiments, the control task 120-1 on the node 110-1 may sort an amount of available resources for a plurality of nodes in the distributed system from highest to lowest based on the resource usage information, and determine the first work task according to the ranking of the node 110-1 among the plurality of nodes 110. For example, works task(s) running on the last-ranked node 110 can be chosen as the first work task(s). In some embodiments, the control task 120-1 on the node 110-1 may determine an amount of available resources for the node 110-1 and an average amount of available resources for the system based on the resource usage information, so that the first work task is determined based on the amount of available resources and average amount of available resources. An embodiment in which the control task 120-1 determines the first work task for the node 110-1 based on the resource usage information will be described in detail below with reference to FIG. 3.

At block 230, the first authority is caused to be released. The node 110-1 may cause the selected first work task having an authority to release the first authority, thereby releasing resources occupied by the work task. In some embodiments, the control task 120-1 on the node 110-1 may signal the first work task 130-1 on the node 110-1, so that the first authority of the first work task is released. In some embodiments, the first work task 130-1 on the node 110-1 may release the first authority it has.

By collecting resource usage information at each node in the distributed system, each node in the distributed system can dynamically migrate a load according to the resource usage status, so that the task load is distributed as evenly as possible on the nodes. In addition, since all nodes in the distributed system can assume the load balancing task, once an individual node fails or the workload is too heavy, other nodes can also perform effective load balancing according to the resource usage status.

Figure 3:
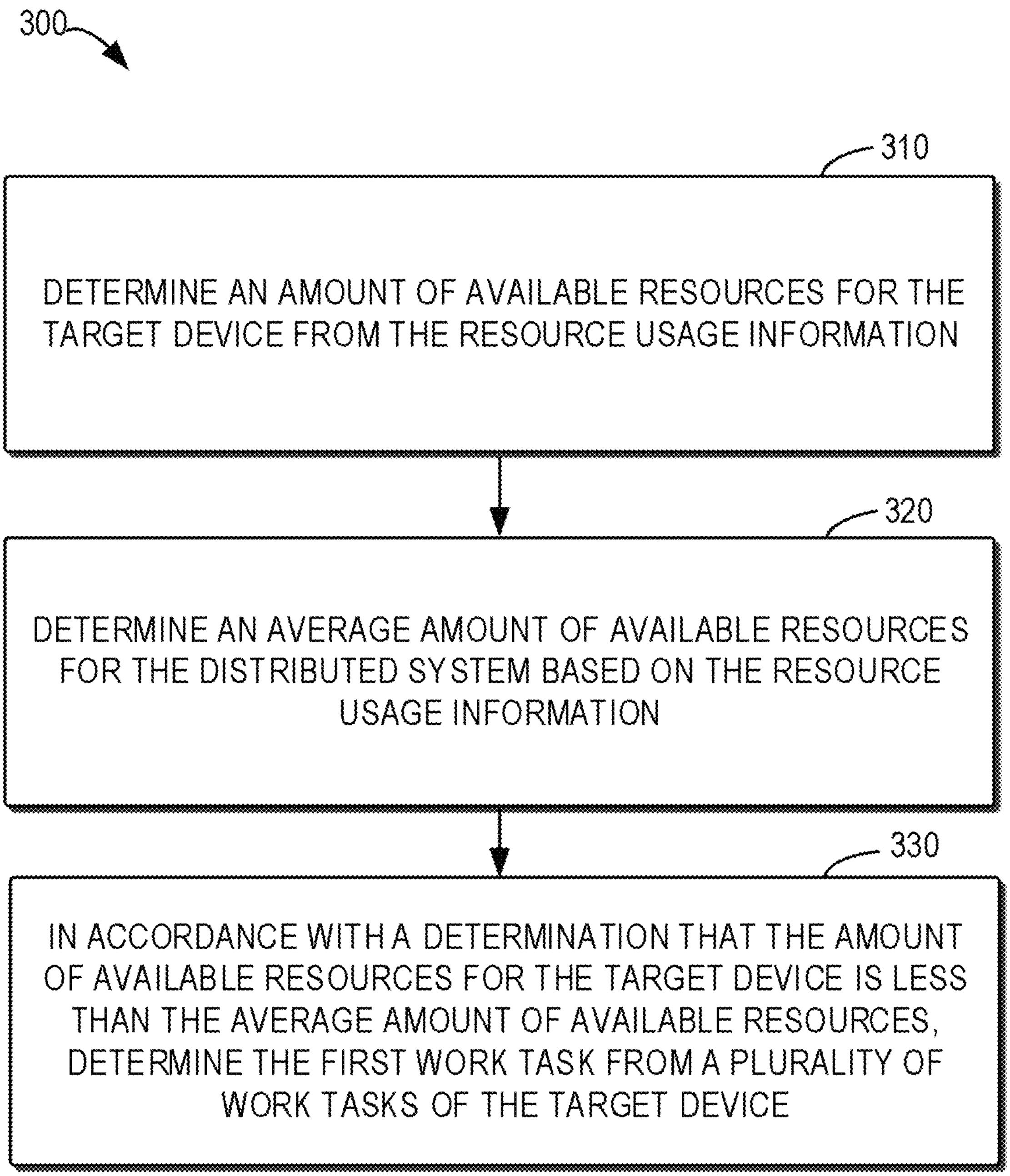
FIG. 3 shows a flowchart of a process of determining a work task to be stopped based on resource usage information according to an embodiment of the present disclosure.

FIG. 3 shows a flowchart of a process 300 for determining a work task to be stopped based on resource usage information according to some embodiments of the present disclosure. For ease of discussion, the process 300 is described in conjunction with FIG. 1. In such an example, the process 300 may be performed by a control task 120 on a target device (e.g., node 110), and the process 300 is described with respect to the control task 120-1 on the node 110-1 for illustrative purposes only. In some embodiments, the process 300 may be considered as a specific implementation of the block 220 of the process 200.

At block 310, the control task 120-1 on the node 110-1 determines an amount of available resources of the node 110-1 from the resource usage information. The collected resource usage information include various status information of various resources of the node 110-1. For example, the resource usage information may include the available amounts of various resources for the node 110-1, the usage amounts of various resources, and the like. The control task 120-1 on the node 110-1 may extract the amount of available resources for the node 110-1 from the resource usage information. For example, the available amount of memory, the available amount of CPU, and the available amount of disks of the node 110-1.

At block 320, the control task 120-1 on the node 110-1 determines an average amount of available resources for the distributed system 101 based on the resource usage information. The collected resource usage information also includes various status information of various resources of other nodes 110-2 to 110-N. For example, the available amount of memory, the available amount of CPU, and the available amount of disks of other nodes 110-2 to 110-N. The control task 120-1 on the node 110-1 may calculate the average amount of available resources for the distributed system 101 based on the available amount of various resources for each node. For example, the average available amount of memory, the average available amount of CPU, and the average available amount of disks of the distributed system 101, etc. are calculated.

At block 330, in accordance with a determination that the amount of available resources for the node 110-1 is less than the average amount of available resources, the control task 120-1 on the node 110-1 determines the first work task from a plurality of work tasks of the node 110-1. For example, the control task 120-1 on the node 110-1 compares the amount of available resources for the node 110-1 with the average amount of available resources for the distributed system 101. If the amount of available resources for the node 110-1 is less than the average amount of available resources, it can be determined that the node 110-1 has less available resources compared to other nodes. In this case, the control task 120-1 on the node 110-1 may select one or more work tasks from a plurality of work tasks of the node 110-1. The control task 120-1 may select one or more of the plurality of work tasks randomly, or may select according to a certain rule. For example, the plurality of work tasks are sorted according to the required amount of resources, and several work tasks requiring more resources are selected, or several work tasks with higher priorities are selected according to the priority of the work tasks. The work tasks having an authority can be determined among the selected one or more work tasks, and stopping these work tasks having the authority can reduce the task load on the node 110-1.

In such an embodiment, the resource usage information is collected through a control task on each node, and part of the work tasks that are being executed are stopped according to the resource usage information, thereby releasing more resources and causing the work tasks on nodes with insufficient resources to be migrated to other nodes with good resource conditions. In this way, resources in the distributed system can be used more efficiently and performance may be improved.

In some embodiments, the control task 120-1 on the node 110-1 may send a signal to instruct a stop of the first work task, to cause the first work task to be stopped. For example, the control task 120-1 on the node 110-1 may send a signal to instruct a stop of the work task having an authority to one or more work tasks 130 selected from a plurality of work tasks for the node 110-1, to cause the work task having the authority to be stopped.

In some embodiments, if the amount of available resources for the node 110-1 is greater than or equal to the average amount of available resources, it may be determined that the node 110-1 has more available resources than other nodes. In this case, the control task 120-1 on the node 110-1 may send resource usage information to each work task 130 on the node 110-1, so that the work task 130 may perform load balancing according to the resources required by the work task 130 based on the resource usage information.

Figure 4:
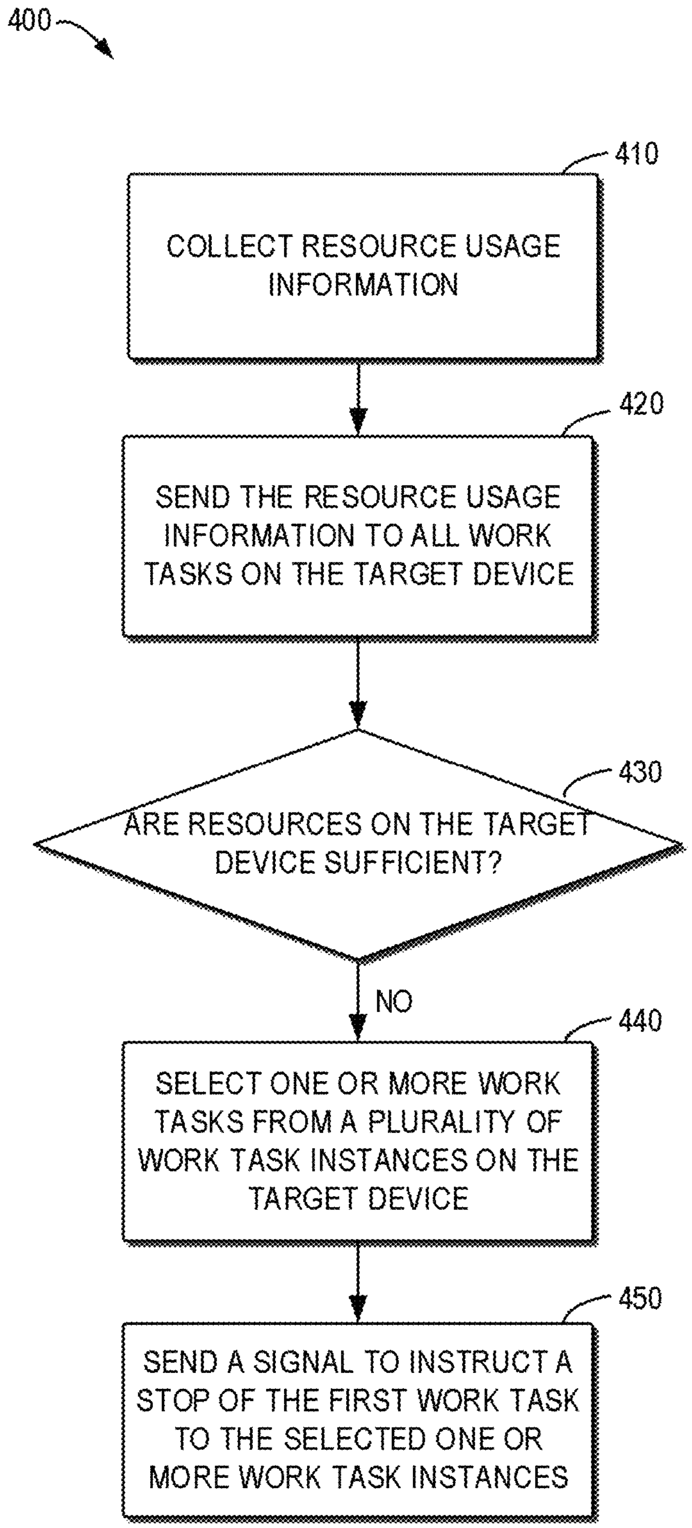
FIG. 4 shows a flowchart of a process for load balancing according to an embodiment of the present disclosure.

FIG. 4 shows a flowchart of a process 200 for load balancing according to an embodiment of the present disclosure. For ease of discussion, the process 400 is described in conjunction with FIG. 1. In such an example, the process 400 may be performed by a control task 120 on a target device (e.g., any one of the nodes 110), and the process 400 is described with respect to the control task 120-1 on the node 110-1 for illustrative purposes only. In some embodiments, the process 400 may be considered as a specific implementation of the load balancing process 200 implemented by the control task 120-1 on the node 110-1.

At block 410, the control task 120-1 on the node 110-1 collects the resource usage information for all nodes in the distributed system 101.

At block 420, the control task 120-1 on the node 110-1 may send the resource usage information to each work task 130 on the node 110-1.

At block 430, the control task 120-1 on the node 110-1 determines whether the resources on the node 110-1 are sufficient.

If it is determined that the resources on the node 110-1 are insufficient at block 430, then at block 440, the control task 120-1 on the node 110-1 selects one or more work tasks from a plurality of work tasks 130 on the node 110-1, and at block 450, the control task 120-1 on the node 110-1 sends a signal to instruct a stop of the first work task to the selected one or more work tasks, to cause the first work task to be stopped.

Because the resource usage in the distributed system changes in real time, the process 400 is performed periodically, so that the node 110 can perform load balancing based on the latest resource usage information.

In some embodiments, at block 220 in the process 200, the first work task may be determined respectively by each work task 130 on the node 110-1. An embodiment in which the work task 130 determines the first work task for the node 110-1 based on the resource usage information will be described in detail below.

The control task 120-1 on the node 110-1 may send the resource usage information to a plurality of work tasks 130 on the node 110-1, so that the first work task is determined from a plurality of work tasks based on the resource usage information. After the control task 120-1 on the node 110-1 collects the resource usage information of the plurality of nodes 110 in the distributed system 101, it can directly send the resource usage information to each work task 130 on the node 110-1 without performing any operation. Each work task 130 may determine the first work task based on the resource usage information and the amount of available resources for the node 110-1.

In some embodiments, each work task 130 may calculate the average amount of available resources for the distributed system 101 based on the resource usage information, and compare the average amount of available resources with the amount of available resources for the node 110-1. During the comparison, because each work task requires different types of resources, for example, some work tasks require a large amount of CPU resources, and some work tasks need to consume a large amount of memory. Therefore, each work task 130 may compare the amount of different types of available resources in the resource usage information. For example, the work task 130 of a work task that requires a large amount of CPU resources may compare the available amount of CPU with the average available amount of CPU. If the available amount of CPU is less than the average available amount of CPU, the work task corresponding to the work task 130 is determined as the first work task; while the work task 130 that needs to consume a large amount of memory can compare the available amount of memory with the average available amount of memory. If the available amount of memory is less than the average available amount of memory, the work task corresponding to the work task 130 is determined as the first work task. It may be understood that the available amounts of multiple types of resources can be compared at the same time.

In such an embodiment, each work task on each node decides whether to stop according to the resource usage information, so that each work task can make a decision based on the specific resource that is most concerned about. In this way, load balancing may be performed more flexibly, thereby further improving task execution efficiency.

In some embodiments, the node 110-1 may further adjust the frequency of requesting the first authority, based on the resource usage information. As can be seen from the description of FIG. 1 above, the plurality of work tasks 130 running on the node 110-1 may be in two states: a task execution state that has acquired a lock (authority) and a lock-contending state that has not acquired a lock. A work task 130 in the task execution state immediately turns to the lock-contending state after releasing its authority. The first work task on the node 110-1 may adjust the frequency of requesting for the first authority based on the resource usage information. When multiple nodes in a distributed system start to work, they all contend for locks at a reference frequency. After the node 110-1 collects resource usage information, each work task 130 on the node 110-1 may determine the available amount of different resources of other nodes 110-2 to 110-M based on the resource usage information, thereby determining the average available resource amount of different resources of the distributed system. In some embodiments, each work task 130 on the node 110-1 may compare the amount of available resources of its interest with the average amount of available resources. If the amount of available resources of its interest is greater than the average amount of available resources, the frequency is adjusted to above the reference frequency; if the amount of available resources of its interest is less than the average amount of available resources, the frequency is adjusted to below the reference frequency.

In this way, by changing the frequency of stopped work tasks requesting for the locks, it is possible to ensure that work tasks on nodes with more resources are more likely to obtain an authority than work tasks on nodes with fewer resources, thereby further causing the task load to be evenly distributed on the nodes, so that the resources in the distributed system can be used more efficiently.

Since the control task 120-1 on the node 110-1 sends a signal to instruct a stop of the work task having an authority to the work task 130 of one or more work tasks selected from a plurality of work tasks for the node 110-1, there are one or more work tasks in the work task 130 that have not received the stop signal. In some embodiments, the node 110-1 may further determine a work task (hereinafter referred to as a second work task for convenience of description) having an authority (hereinafter referred to as a second authority for convenience of description) among one or more work tasks that have not received the stop signal.

Figure 5:
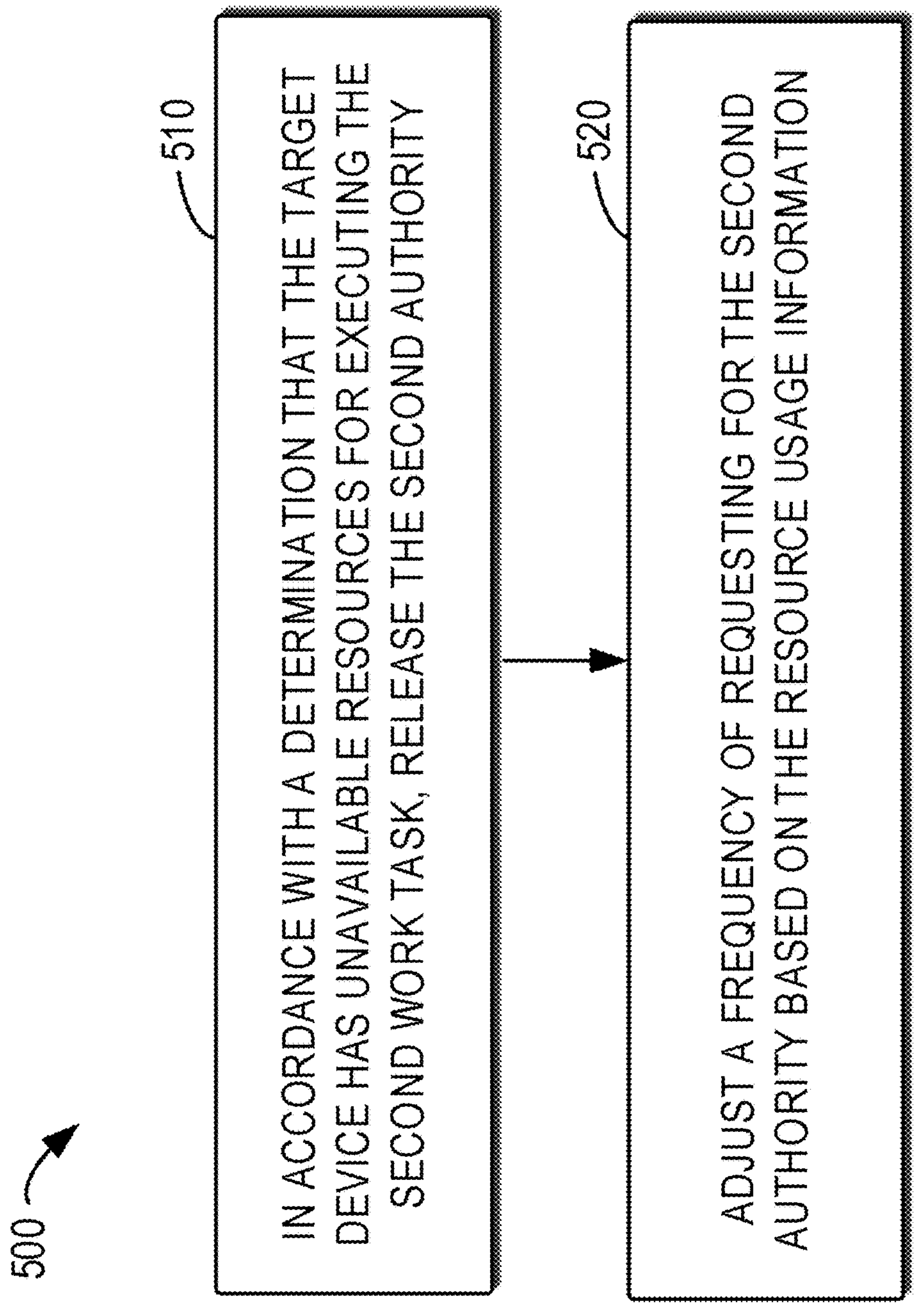
FIG. 5 shows a flowchart of a process of determining a work task that has not received a stop signal to be stopped based on resource usage information according to an embodiment of the present disclosure.

FIG. 5 shows a flowchart of a process 500 of determining a work task that has not received a stop signal to be stopped based on resource usage information according to some embodiments of the present disclosure. For ease of discussion, the process 500 is described in conjunction with FIG. 1. In such an example, the process 500 may be performed by each work task 130 on the target device (e.g., any one of the nodes 110), and the process 500 is described with respect to the work task 130-1 on the node 110-1 for illustrative purposes only.

At block 510, in accordance with a determination that the node 110-1 has unavailable resources for executing the second work task, the work task 130-1 of the second work task having the second authority may release the second authority. In other words, for one or more work tasks that have not received the stop signal, each work task may determine whether it has an authority. If it has an authority, in accordance with a determination that the node 110-1 has unavailable resources for executing the second work task, its corresponding work task 130 may release the second authority. Each work task 130 may determine, based on the resource usage information and the amount of available resources of the node 110-1, that the node 110-1 has unavailable resources for executing the second work task. The determination process is the same as the process of the work task 130 determining the first work task, and details are not described herein again. In this regard, it is to be noted that the term "unavailable resources" as used herein does not mean the resources are not available on the nodes, but rather the term "unavailable resources" means the resources on the nodes are not as sufficient as those resources on other nodes.

At block 520, the work task 130-1 on the node 110-1 may adjust the frequency of requesting for the second authority based on the resource usage information. The process of adjusting the frequency is the same as the process of the node 110-1 adjusting the frequency of requesting for the first authority based on the resource usage information, and details are not described herein again.

In this way, on the basis of the load balancing performed by the control task, the load balancing performed by the work task can be further combined, thereby further improving the efficiency of the load balancing.

In some embodiments, for the work task 130 on the node 110-1 that does not have an authority (hereinafter referred to as a third authority for convenience of description) to execute a work task (hereinafter referred to as a third task for convenience of description), the node 110-1 may also adjust the frequency of requesting for the third authority based on the resource usage information. In other words, for a third work task without authority, the third work task may adjust the frequency of requesting for authorities based on the resource usage information. For example, the third work task may compare the available resources of node 110-1 with the average available resources. If the available resources are more than the average available resources, the frequency of the third work task is increased, and otherwise, the frequency of the third work task is decreased.

In this way, by changing the frequency of contention locks for all work tasks which do not have authorities based on resource usage information, it is possible to ensure that work tasks on nodes with more resources are more likely to obtain authorities than work tasks on nodes with fewer resources.

Thus, the task load is evenly distributed on the nodes, so that the resources in the distributed system can be used more efficiently.

Figure 6:
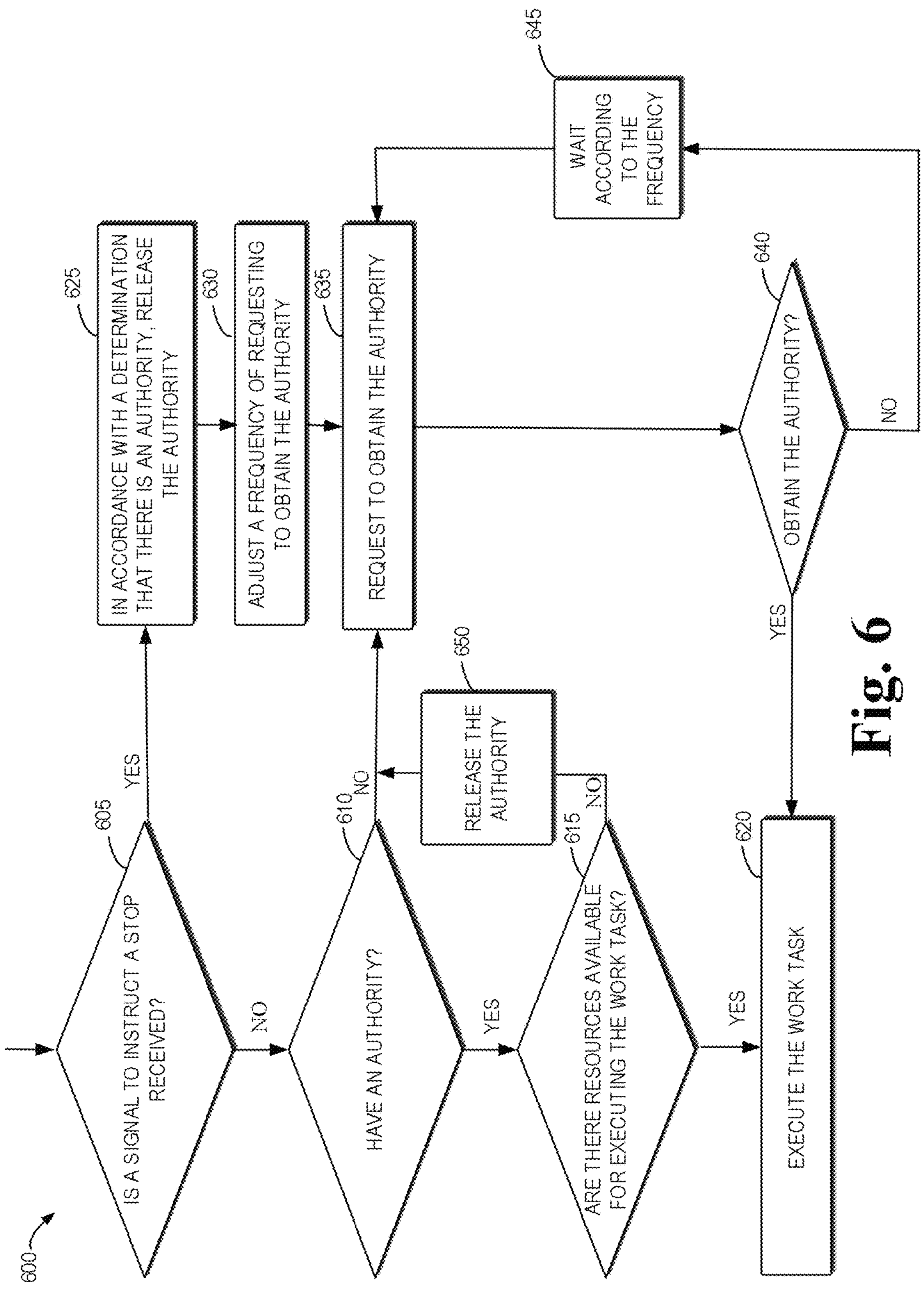
FIG. 6 shows a flowchart of a process for load balancing according to an embodiment of the present disclosure.

FIG. 6 illustrates a flowchart of a process 600 for load balancing according to an embodiment of the present disclosure. For ease of discussion, the process 600 is described in conjunction with FIG. 1. In such an example, the process 600 may be performed by each work task 130 on the target device (e.g., any one of the nodes 110), and the process 600 is described with respect to the work task 130-1 on the node 110-1 for illustrative purposes only.

At block 605, the work task 130-1 on the node 110-1 determines whether a signal instructing a stop of the work task having an authority is received from the control task 120-1. Since the control task 120-1 sends the signal to instruct a stop of the work task having an authority to the work task 130 of one or more work tasks selected from the plurality of work tasks for the node 110-1, among the plurality of work tasks 130 on the node 110-1, there are cases where the signal instructing a stop of the work task having an authority is received and the signal is not received.

If it is determined at block 605 that the work task 130-1 on the node 110-1 receives the signal instructing a stop of the work task, then at block 625, in accordance with a determination that the work task 130-1 on the node 110-1 has the authority, it releases the authority, then adjust the frequency of requesting for the authority at block 630, and request to obtain the authority with the adjusted frequency at block 635, determine whether the authority is obtained at block 640, if the authority is obtained, execute the work task 130-1 at block 620, and otherwise at block 645 wait to request to obtain the authority again at block 635 according to the frequency.

If it is determined at block 605 that the work task 130-1 on the node 110-1 has not received the signal instructing a stop of the work task, then at block 610, the work task 130-1 on the node 110-1 determines whether it has the authority to execute the work task 130-1.

If it is determined at block 610 that it has the authority to execute the work task 130-1, the process 600 proceeds to block 615. In the embodiment shown in FIG. 6, the control task 120-1 may send the resource usage information about each node in the distributed system 101 to the work task 130-1. At block 615, the work task 130-1 determines, based on the resource usage information, whether there are available resources on the node 110-1 for executing the work task 130-1.

If it is determined at block 615 that there are unavailable resources for executing the work task 130-1, then release the authority at block 650, adjust the frequency of requesting to obtain the authority at block 630, request to obtain the authority with the adjusted frequency at block 635, determine whether the authority is obtained at block 640, if the authority is obtained, execute the work task 130-1 at block 620, and otherwise at block 645, wait to request to obtain the authority again at block 635 according to the frequency.

If it is determined at block 615 that there are resources available for executing the work task 130-1, then directly continue to execute the work task 130-1 at block 620.

Since the resource usage in the distributed system changes in real time, the process 600 is performed periodically, so that the node 110 can perform load balancing based on the latest resource usage information.

In some embodiments, resource usage information of the plurality of nodes 110 in the distributed system 101 may be collected by each work task on the node 110-1.

Figure 7:
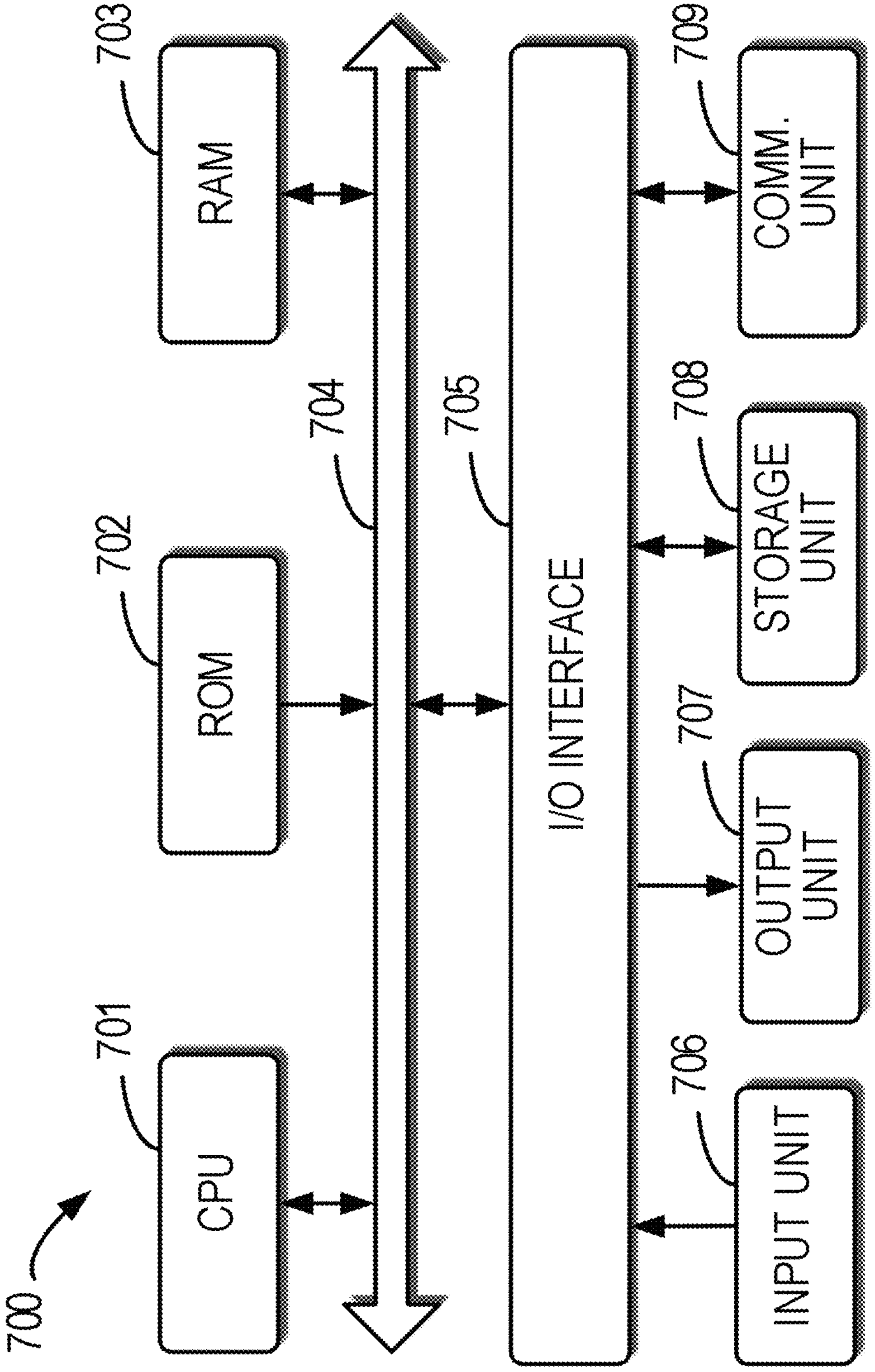
FIG. 7 shows a schematic block diagram of an example device suitable for implementing embodiments of the present disclosure.

FIG. 7 illustrates a schematic block diagram of an example device 700 that can be used to implement embodiments of the present disclosure. As shown, the device 700 includes a central processing unit (CPU) 701, which can perform various appropriate actions and processes according to the computer program instructions stored in a read-only memory (ROM) 702 or the computer program instructions loaded into a random-access memory (RAM) 703 from a storage unit 708. In the RAM 703, various programs and data necessary for the operation of the device 700 can also be stored. CPU 701, ROM 702, and RAM 703 are connected to each other via a bus 704. An input/output (I/O) interface 705 is also connected to the bus 704.

A plurality of components in the device 700 are connected to the I/O interface 705, including: an input unit 706, such as a keyboard, a mouse, etc.; an output unit 707, e.g., various types of displays, speakers, etc.; a storage unit 708, e.g., a magnetic disk, an optical disk, etc.; and a communication unit 709, e.g., a network card, a modem, a wireless communication transceiver, etc. The communication unit 709 allows the device 700 to exchange information/data with other devices via a computer network, such as Internet, and/or various telecommunication networks.

The processing unit 701 performs various methods and processes described above, such as any one of the processes 200, 300, 400, 500, and 600. For example, in some embodiments, any one of the processes 200, 300, 400, 500, and 600 may be implemented as a computer software program or a computer program product that is tangibly embodied on a machine-readable medium, e.g., the storage unit 708. In some embodiments, part or all of the computer program may be loaded and/or installed on the device 700 via the ROM 702 and/or the communication unit 709. When the computer program is loaded into the RAM 703 and executed by the CPU 701, one or more steps of any one of the processes 200, 300, 400, 500, and 600 described above may be performed. Alternatively, in other embodiments, the CPU 701 may be configured to perform any one of the processes 200, 300, 400, 500, and 600 in any other appropriate manner (e.g., by means of firmware).

According to some embodiments of the present disclosure, a computer-readable medium is provided on which a computer program is stored, which when executed by a processor implements a method according to the present disclosure.

Those skilled in the art should understand that each step of the method of the present disclosure described above may be implemented via a general purpose computing device, which may be concentrated on a single computing device or distributed over a network composed of a plurality of computing devices. Optionally, they may be implemented using program code executable by the computing device, such that they can be stored in a storage device and executed by the computing device; or they can be separately made into individual integrated circuit modules, or a plurality of modules or steps therein can be made into a single integrated circuit module for implementation. In this way, the present disclosure is not limited to any particular combination of hardware and software.

It should be understood that although several apparatuses or sub-apparatuses of the device have been mentioned in the detailed description above, such division is only exemplary and not mandatory. In fact, according to the embodiments of the present disclosure, the features and functions of the two or more apparatuses described above may be embodied in one apparatus. Conversely, the features and functions of one apparatus described above can be further divided to be embodied in multiple apparatuses.

The above are only some optional embodiments of the present disclosure and are not intended to limit the present disclosure. For those skilled in the art, the present disclosure may have various alterations and changes. Any modifications, equivalent replacement, and improvements, etc. made within the spirit and principle of the present disclosure shall be included within the protection scope of the present disclosure.

We claim:

1. A method, comprising:

for a load balancing, collecting, at a target device in a distributed system and comprising a processor, resource usage information of a plurality of devices in the distributed system;

determining a first work task for the target device to be stopped based on the resource usage information, the target device having a first authority to execute the first work task;

causing the first authority to be released; and adjusting a frequency of requesting to obtain the first authority based on the resource usage information.

2. The method according to claim 1, wherein the determining the first work task comprises:

determining an amount of available resources for the target device from the resource usage information;

determining an average amount of available resources for the distributed system based on the resource usage information; and in accordance with a determination that the amount of available resources for the target device is less than the average amount of available resources, determining the first work task from a plurality of work tasks of the target device.

3. The method according to claim 1, wherein the determining the first work task comprises:

sending the resource usage information to a plurality of work tasks of the target device, to cause the first work task of the plurality of work tasks to be determined based on the resource usage information.

4. The method according to claim 3, wherein the target device has a second authority to execute a second work task of the plurality of work tasks, and the method further comprises:

in accordance with a determination that the target device has unavailable resources for executing the second work task, releasing the second authority; and adjusting a frequency of requesting for the second authority based on the resource usage information.

5. The method according to claim 1, wherein the target device does not have a second authority to execute a second work task, and the method further comprises:

adjusting a frequency of requesting for the second authority based on the resource usage information.

6. The method according to claim 1, wherein the resource usage information comprises at least one of: an available amount of storage resources, an available amount of dedicated processing resources, an available amount of processing unit resources, a usage amount of storage resources, a usage amount of dedicated processing resources, or a usage amount of processing unit resources.

7. The method according to claim 1, further comprising: sending a signal to instruct a stop of the first work task, to cause the first work task to be stopped.

8. A target device in a distributed system, comprising:

a processor; and a memory coupled to the processor and having instructions stored thereon, the instructions, when executed by a processor of the target device, causing the target device to perform acts, the acts comprising:

collecting resource usage information of devices in the distributed system;

determining a first work task for the target device to be stopped based on the resource usage information, the target device having a first authority to execute the first work task;

causing the first authority to be released; and adjusting a frequency of requesting for the first authority based on the resource usage information.

9. The target device according to claim 8, wherein the determining the first work task comprises:

determining an amount of available resources for the target device from the resource usage information;

determining an average amount of available resources for the distributed system based on the resource usage information; and in accordance with a determination that the amount of available resources for the target device is less than the average amount of available resources, determining the first work task from work tasks of the target device.

10. The target device according to claim 8, wherein the determining the first work task comprises:

sending the resource usage information to work tasks of the target device, to cause the first work task of the work tasks to be determined based on the resource usage information.

11. The target device according to claim 10, wherein the target device has a second authority to execute a second work task of the work tasks, and the acts further comprise:

in accordance with a determination that the target device has unavailable resources for executing the second work task, releasing the second authority; and adjusting a frequency of requesting for the second authority based on the resource usage information.

12. The target device according to claim 8, wherein the target device does not have a second authority to execute a second work task, and the acts further comprise:

adjusting a frequency of requesting for the second authority based on the resource usage information.

13. The target device according to claim 8, wherein the resource usage information comprises at least one of: an available amount of storage resources, an available amount of dedicated processing resources, an available amount of processing unit resources, a usage amount of storage resources, a usage amount of dedicated processing resources, or a usage amount of processing unit resources.

14. The target device according to claim 8, the acts further comprising: sending a signal to instruct a stop of the first work task, to cause the first work task to be stopped.

15. A computer program product stored on a non-transitory computer-readable medium and comprising machine-executable instructions that, when executed, cause a target device in a distributed system to perform operations, comprising:

obtaining resource usage information of a group of devices in the distributed system;

determining a work task for the target device to be stopped based on the resource usage information, the target device being assigned an authority to execute the work task;

causing the authority to be released; and adjusting a frequency of requesting for the authority based on the resource usage information.

16. The computer program product according to claim 15, wherein the operations further comprise:

sending a signal to instruct a stop of first work task, to cause the work task to be stopped.

17. The computer program product according to claim 15, wherein the determining the work task comprises:

determining an amount of available resources for the target device from the resource usage information;

determining an average amount of available resources for the distributed system based on the resource usage information; and in accordance with a first determination that the amount of available resources for the target device is less than the average amount of available resources, determining the work task from a group of work tasks of the target device, wherein the authority to execute the work task is a first authority of a first work task, and wherein the determining the first work task comprises:

sending the resource usage information to the group of work tasks of the target device, to cause the first work task of the group of work tasks to be determined based on the resource usage information, wherein the target device has a second authority to execute a second work task of the group of work tasks, and wherein the operations further comprise:

in accordance with a second determination that the target device has unavailable resources for executing the second work task, releasing the second authority; and adjusting a frequency of requesting for the second authority based on the resource usage information.

18. The computer program product according to claim 15, wherein the authority to execute the work task is a first authority of a first work task, wherein the target device does not have a second authority to execute a second work task, and wherein the operations further comprise:

adjusting a frequency of requesting for the second authority based on the resource usage information.

19. The computer program product according to claim 15, wherein the operations further comprise:

adjusting a frequency of contention locks on the work task of the target device based on the resource usage information.

20. The computer program product according to claim 19, wherein the target device does not have the authority to execute the work task.

* * * * *